(12) United States Patent
Ren et al.

(10) Patent No.: US 10,752,406 B2
(45) Date of Patent: Aug. 25, 2020

(54) SMART SEAL CLAMP, PACKAGING BAG, AND STORAGE AND MANAGEMENT METHOD OF OBJECT

(71) Applicant: BOE TECHNOLOGY GROUP CO., LTD., Beijing (CN)

(72) Inventors: Yan Ren, Beijing (CN); Zifeng Wang, Beijing (CN); Lei Cao, Beijing (CN); Nannan Hu, Beijing (CN); She Lin, Beijing (CN)

(73) Assignee: BOE TECHNOLOGY GROUP., LTD., Beijing (CN)

( * ) Notice: Subject to any disclaimer, the term of this patent is extended or adjusted under 35 U.S.C. 154(b) by 205 days.

(21) Appl. No.: 15/562,190

(22) PCT Filed: Apr. 14, 2017

(86) PCT No.: PCT/CN2017/080592
§ 371 (c)(1),
(2) Date: Sep. 27, 2017

(87) PCT Pub. No.: WO2018/028233
PCT Pub. Date: Feb. 15, 2018

(65) Prior Publication Data
US 2018/0346200 A1 Dec. 6, 2018

(30) Foreign Application Priority Data
Aug. 11, 2016 (CN) .......................... 2016 1 0657214

(51) Int. Cl.
B65D 33/16 (2006.01)
B65D 33/25 (2006.01)
(Continued)

(52) U.S. Cl.
CPC ......... B65D 33/1675 (2013.01); B65D 33/16 (2013.01); B65D 33/25 (2013.01);
(Continued)

(58) Field of Classification Search
None
See application file for complete search history.

(56) References Cited

U.S. PATENT DOCUMENTS 5,079,806 A * 1/1992 Allen ................. B65D 33/1675
24/30.5 R
5,379,489 A * 1/1995 Delk ................. B65D 33/1675
24/30.5 R
(Continued)

FOREIGN PATENT DOCUMENTS

CN 1478035 A 2/2004
CN 1910055 A 2/2007
(Continued)

OTHER PUBLICATIONS

International Search Report dated Jul. 11, 2017.
First Chinese Office Action dated Feb. 22, 2019.

Primary Examiner — Hemant Desai
Assistant Examiner — Tanzim Imam
(74) Attorney, Agent, or Firm — Dilworth & Barrese, LLP.; Michael J. Musella, Esq.

(57) ABSTRACT

A smart seal clamp, smart packaging bag and storage and management method of an object are provided. The smart seal clamp, configured to clamp a packaging bag for containing a storage object, includes: a circuit board, a camera, a seal structure; and at least one trigger structure. The camera is configured to acquire information, the trigger structure is configured to trigger the seal structure to seal the packaging bag, the circuit board includes a camera circuit and a trigger structure circuit; the camera circuit is communicated with the camera and configured to control the camera, the trigger structure circuit is communicated with the trigger structure and configured to control the trigger structure, the trigger structure circuit is further communicated with the camera circuit and configured to control the (Continued)

trigger structure according to the information acquired by the camera.

16 Claims, 5 Drawing Sheets

(51) Int. Cl.
  *G06K 7/14* (2006.01)
  *G06K 9/00* (2006.01)
  *H04N 5/232* (2006.01)
  *G06F 21/32* (2013.01)

(52) U.S. Cl.
  CPC ........... *G06F 21/32* (2013.01); *G06K 7/1413* (2013.01); *G06K 7/1417* (2013.01); *G06K 9/00006* (2013.01); *G06K 9/00228* (2013.01); *H04N 5/232* (2013.01); *G06K 2009/00322* (2013.01)

(56) References Cited

U.S. PATENT DOCUMENTS

| | | | |
|---|---|---|---|
| 5,797,683 A * | 8/1998 | Gunzi | A45C 11/22 383/68 |
| 6,874,967 B1 | 4/2005 | Tsaur | |
| 2005/0151620 A1 * | 7/2005 | Neumann | G06K 9/00006 340/5.52 |
| 2009/0268989 A1 * | 10/2009 | Berland | B65D 33/1675 383/5 |
| 2015/0131927 A1 | 5/2015 | Kasai | |
| 2015/0161871 A1 * | 6/2015 | Kim | A61B 5/4561 340/539.12 |
| 2015/0225227 A1 * | 8/2015 | Ishizawa | B41J 29/13 383/12 |
| 2015/0320209 A1 * | 11/2015 | Hasselback | H04N 5/2251 348/151 |
| 2016/0358508 A1 * | 12/2016 | Cheatham, III | G09B 19/0092 |

FOREIGN PATENT DOCUMENTS

| | | |
|---|---|---|
| CN | 101217896 A | 7/2008 |
| CN | 102107745 A | 6/2011 |
| CN | 103742031 A | 4/2014 |
| CN | 104129562 A | 11/2014 |
| CN | 204280218 U | 4/2015 |
| CN | 10469851 A | 6/2015 |
| CN | 105467648 A | 4/2016 |
| CN | 105711943 A | 6/2016 |
| CN | 205353509 U | 6/2016 |
| CN | 205952639 U | 2/2017 |
| EP | 1088768 A3 | 9/2003 |
| EP | 1956514 A1 | 10/2007 |
| WO | 0226579 A1 | 4/2002 |

* cited by examiner

SMART SEAL CLAMP, PACKAGING BAG, AND STORAGE AND MANAGEMENT METHOD OF OBJECT

TECHNICAL FIELD

Embodiments of the present disclosure relate to a smart seal clamp, a smart packaging bag and a storage and management method of an object.

BACKGROUND

Generally, when people use objects such as food or medicine, the food or medicine will not be consumed for one time. At this time, it is needed to store the rest objects such as food or medicine, so that they can be used again. And it is a simple, effective, and economical method to use a seal clamp to seal a bag in which the objects such as food or medicine are stored.

QR (Quick Response) code or bar code is a black and white pattern which is configured to record digital information. The digital information can be read or automatically processed by using an image input device or an optical scanning device to scan the QR code or bar code. Besides, QR code or bar code is very common in people's daily life, and almost all of the food or medicine has a QR code or bar code to record its product information.

SUMMARY

At least one embodiment of the present disclosure provides a smart seal clamp, smart packaging bag and storage and management method of an object. The smart seal clamp, configured to clamp a packaging bag for containing a storage object, comprises: a circuit board, a camera, a seal structure; and at least one trigger structure. The camera is configured to acquire information, the trigger structure is configured to trigger the seal structure to seal the packaging bag, the circuit board comprises a camera circuit and a trigger structure circuit; the camera circuit is communicated with the camera and configured to control the camera, the trigger structure circuit is communicated with the trigger structure and configured to control the trigger structure, the trigger structure circuit is further communicated with the camera circuit and configured to control the trigger structure according to the information acquired by the camera. Thus, the smart seal clamp can avoid the storage object being eaten or used by mistake.

At least one embodiment of the present disclosure provides a smart seal clamp, configured to clamp a packaging bag for containing a storage object, comprising: a circuit board; a camera, configured to acquire information; a seal structure; and at least one trigger structure, configured to trigger the seal structure to seal the packaging bag, the circuit board comprises a camera circuit and a trigger structure circuit; the camera circuit is communicated with the camera and configured to control the camera, the trigger structure circuit is communicated with the trigger structure and configured to control the trigger structure, the trigger structure circuit is further communicated with the camera circuit and configured to control the trigger structure according to the information acquired by the camera.

For example, in the smart seal clamp provided by an embodiment of the present disclosure, the information acquired by the camera comprises information of the storage object, the trigger structure circuit is configured to control the trigger structure according to the information of the storage object acquired by the camera.

For example, in the smart seal clamp provided by an embodiment of the present disclosure, the information of the storage object comprises an expiration date of the storage object, the circuit board further comprises: a timing circuit, the timing circuit is communicated with the camera circuit and configured to count down according to the expiration date of the storage object, the timing circuit is communicated with the trigger structure circuit, the trigger structure circuit is configured to trigger the seal structure to seal the packaging bag upon countdown being zero.

For example, in the smart seal clamp provided by an embodiment of the present disclosure, the information acquired by the camera further comprises face information of a current user, the circuit board further comprises: a processor, communicated with the camera circuit and configured to process and judge the face information of the current user, the processor is communicated with the trigger structure circuit, the trigger structure circuit is configured to trigger the seal structure to seal the packaging bag according to a judgment result of the processor.

For example, in the smart seal clamp provided by an embodiment of the present disclosure, the processor is configured to judge whether the current user is a child, the trigger structure circuit is configured to trigger the seal structure to seal the packaging bag upon the judgment result of the processor being yes.

For example, in the smart seal clamp provided by an embodiment of the present disclosure, the circuit board further comprises a memory, configured to store pictures of various objects or pre-input face information, the processor is communicated with the memory and configured to judge specie of the storage object with the pictures of various objects or judge the face information of the current user with the pre-input face information.

For example, in the smart seal clamp provided by an embodiment of the present disclosure, the camera is located on the circuit board.

For example, in the smart seal clamp provided by an embodiment of the present disclosure, the at least one trigger structure is located on the circuit board.

For example, in the smart seal clamp provided by an embodiment of the present disclosure, the smart seal clamp further comprises: an infrared detector, the infrared detector is configured to detect a state of the storage object in the packaging bag or the smart seal clamp.

For example, in the smart seal clamp provided by an embodiment of the present disclosure, the trigger structure comprises a retractable needle structure, the seal structure comprises an encapsulation and a liquid sealant encapsulated in the encapsulation, the retractable needle structure is configured to puncture the encapsulation to make the liquid sealant flow out and seal the packaging bag under a triggered state.

For example, in the smart seal clamp provided by an embodiment of the present disclosure, the retractable needle structure is configured to puncture the encapsulation and the packaging bag to make the liquid sealant flow out and seal the packaging bag under the triggered state.

For example, in the smart seal clamp provided by an embodiment of the present disclosure, the trigger structure comprises a metal heater, the seal structure comprises a thermo-sensitive sealant, the metal heater is configured to use electricity to heat and fuse the thermo-sensitive sealant to seal the packaging bag under a triggered state.

For example, in the smart seal clamp provided by an embodiment of the present disclosure, the circuit board further comprises a shake sense circuit, communicated with the camera circuit, and configured to activate the camera upon sensing a shake.

For example, in the smart seal clamp provided by an embodiment of the present disclosure, the smart seal clamp further comprises: an upper cap, comprising a first via hole; and a lower cap, comprising at least one second via hole and a containing groove corresponding to the second via hole, the upper cap and the lower cap are assembled to form a shell, the containing groove is located at a side of the lower gap away from the upper gap, the circuit board, the camera and the trigger structure are located inside the shell, the camera is exposed out of the shell from the first via hole, the trigger structure is exposed out of the shell from the second via hole, the seal structure is located in the containing groove.

For example, in the smart seal clamp provided by an embodiment of the present disclosure, the smart seal clamp further comprises: a hold plate, one end of the hold plate is connected with the shell, the other end of the hold plate comprises a clamping portion, the clamping portion is configured to be fixed with the shell to tightly clamp an opening of the packaging bag between the shell and the hold plate.

For example, in the smart seal clamp provided by an embodiment of the present disclosure, the clamping portion comprises a fingerprint recognition module, communicated with the circuit board, and configured to detect and recognize a fingerprint.

For example, in the smart seal clamp provided by an embodiment of the present disclosure, the storage object comprises food or medicine.

At least one embodiment of the present disclosure provides a smart packaging bag, comprising: a packaging bag; and a smart seal clamp located at an opening of the packaging bag, the smart seal clamp comprising the smart seal clamp according to any one of the abovementioned smart seal clamps.

At least one embodiment of the present disclosure provides a storage and management method of an object, comprising: providing a packaging bag; the packing bag receiving an object to be stored; acquiring an expiration date of the object to be stored; counting down according to the expiration date; and automatically sealing the packaging bag upon countdown being zero.

For example, in the storage and management method of an object provided by an embodiment of the present disclosure, the method further comprises: acquiring specie information of the object to be stored; acquiring face information or fingerprint information of a current user upon the object to be stored being medicine; judging whether the current user is an adult or a child according to the face information or the fingerprint information of the current user; sealing the packaging bag upon the current user being judged as a child.

For example, in the storage and management method of an object provided by an embodiment of the present disclosure, acquiring the expiration date or the specie information of the object to be stored comprises: using a camera to acquire expiration date or the specie information of the object to be stored.

For example, in the storage and management method of an object provided by an embodiment of the present disclosure, the method further comprises: detecting a shake; and activating the camera upon a shake being detected.

For example, in the storage and management method of an object provided by an embodiment of the present disclosure, sealing the packaging bag comprises: using a retractable needle structure to puncture an encapsulation encapsulating a liquid sealant to make the liquid sealant flow out and seal the packaging bag.

For example, in the storage and management method of an object provided by an embodiment of the present disclosure, sealing the packaging bag comprises: using a metal heater to heat and fuse a thermo-sensitive sealant to seal the packaging bag.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention, not limitative to the present disclosure.

DETAILED DESCRIPTION

Figure 1:
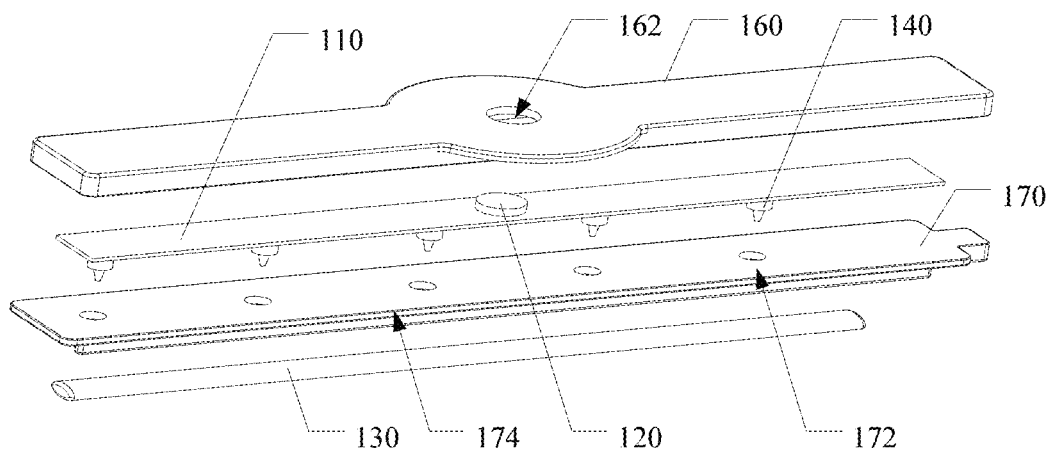
FIG. 1 is an exploded schematic diagram of a smart seal clamp provided by an embodiment of the present disclosure.

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the disclosure. Based on the described embodiments herein, one person skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," and so on which are used in the description and the claims of the present application for invention, are not intended to indicate any sequence, amount or importance, but distinguish various components. The terms "includes," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

The inventor(s) of the present application notices in the study that: at preset, it is normal for many families in the modern society that young people are working outside and only the elderly and children stay home. Because the elderly and the child cannot see clearly or cannot read the manufacture date, the expiration date of food or medicine, many old elderly or children eat the food or medicine by mistake, thereby causing harm to their health, big or small. What is worse, some children died due to mistaken ingestion of medicine, thereby causing a tragedy to the whole family.

Embodiments of the present disclosure provide a smart seal clamp, a smart packaging bag and a storage and management method of an object. The smart seal clamp is used to clamp a packaging bag for containing a storage object, and comprises a circuit board; a camera; a seal structure; and at least one trigger structure. The camera is configured to acquire information, and the trigger structure is configured to trigger the seal structure to seal the packaging bag, the circuit board comprises a camera circuit and a trigger structure circuit; the camera circuit is communicated with the camera and configured to control the camera, the trigger structure circuit is communicated with the trigger structure and configured to control the trigger structure, the trigger structure circuit is further communicated with the camera circuit and configured to control the trigger structure according to the information acquired by the camera. Thus, the smart seal clamp provides a new type of smart home device, which can control the trigger structure to trigger the seal structure according to the information acquired by the camera, and seal the packaging bag upon the storage object being expired or the storage object being uneatable or unusable, so as the avoid the storage object being eaten or used by mistake.

Hereafter, the smart seal clamp, smart packaging bag and storage and management method of an object provided by the embodiments of the present disclosure will be described in detail with reference to the accompanying drawings.

First Embodiment

The present embodiment provides a smart seal clamp, configured to clamp a packaging bag for containing a storage object. As illustrated by FIG. 1, the smart seal clamp comprises: a circuit board 110, a camera 120, a seal structure 130, and at least one trigger structure 140. The camera 120 is configured to acquire information, such as information of the storage object and face information of a current user. The trigger structure 140 is configured to trigger the seal structure 130 to seal the packaging bag. It is to be noted that the information acquired by the camera 120 may include image information, such as image information of the storage object, image information of a QR code or bar code associated with the manufacture date or the expiration date of the storage object, and face information of the current user.

Figure 2:
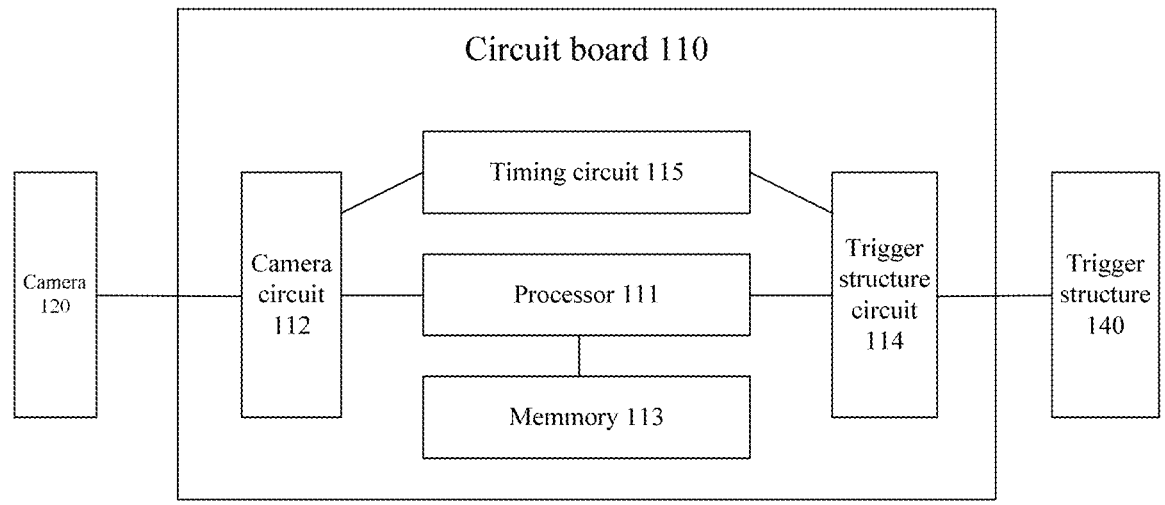
FIG. 2 is a schematic diagram of internal modules in a circuit board of a smart seal clamp provided by an embodiment of the present disclosure.

FIG. 2 is a schematic diagram of internal modules in a circuit board in a smart seal clamp. As illustrated by FIG. 2, the circuit board 110 includes a camera circuit 112 and a trigger structure circuit 114; the camera 120 is communicated with the camera circuit 112 (for example, the camera circuit 112 is communicated with the camera 120 through a wire or wireless method) and controlled by the camera circuit 112, that is, the camera circuit 112 is communicated with the camera 120 and configured to control the camera 120. The trigger structure 140 is communicated with the trigger structure circuit 114 and controlled by the trigger structure circuit 114, that is, the trigger structure circuit 114 is communicated with the trigger structure 140 and configured to control the trigger structure 140; the trigger structure circuit 114 is communicated with the camera circuit 112 and configured to control the trigger structure 140 according to the information acquired by the camera 120.

In the smart seal clamp provided by the present embodiment, the camera circuit can control the camera to acquire information, such as information of the storage object (for example, specie, manufacture data, expiration date of the storage object) or face information of a current user. The camera circuit is communicated with the trigger structure circuit; thus, the trigger structure circuit can control the trigger structure to trigger the seal structure to seal the packaging bag according to the information acquired by the camera upon the storage object being expired or the storage object being uneatable or unusable. At this time, the seal structure seals the packaging bag, even if the smart seal clamp provided by the present embodiment is open, the packaging bag cannot be open since the packaging bag is sealed by the seal structure, so as to prevent the storage object from being eaten or used by mistake. Besides, because the seal structure is replaceable, after the seal structure is triggered, the smart seal clamp can be reused by replacing the seal structure. It is to be noted that, the abovementioned "communicated" can be realized through a wire method (for example, a signal wire) or a wireless method (for example, WiFi signal), and the abovementioned "communicated" can be direct communication or indirect communication. Moreover, the abovementioned "current user" is a human or an animal who is opening or preparing to open the packaging bag.

It is to be noted that, the abovementioned "tightly clamp" refers to that the smart seal clamp tightly clamps the packaging bag, at this time, the storage object in the packaging bag stays in an isolation state from outside, and the stress of the smart seal clamp on the packaging bag can be set to isolate the storage object from the water and oxygen outside, so as to preserve the storage object well; but the packaging bag can be open by opening the smart seal clamp, so as to take out the storage object. However, the abovementioned "seal" refers to that, even if the smart seal clamp is open, the packaging bag still cannot be open since the packaging bag is sealed by the seal structure, and the storage object cannot be put in or taken out.

For example, in the smart seal clamp provided by an example of the present embodiment, the seal structure comprises a replaceable sealant, which can be triggered by a trigger structure to recover flow-ability. For example, puncturing an encapsulation encapsulated with a liquid sealant or heating and fusing a solid sealant, so as to seal the packaging bag. Certainly, the embodiments of the present disclosure include but are not limited thereto, and the seal structure may adopt other seal structures such as a seal bar, a buckle structure.

For example, in the smart seal clamp provided by an example of the present embodiment, the information acquired by the camera includes information of the storage object, such as specie, manufacture date, and expiration date of the storage object. The trigger structure circuit can control the trigger structure according to the information of the storage object acquired by the camera.

For example, the specie, manufacture date, and expiration date of the storage object can be acquired by control the camera to scan a QR code or bar code (for example, acquiring an image of the QR code or bar code) on the packaging bag of the storage object. Certainly, the embodiments of the present disclosure include but are not limited thereto. Besides, with regard to a storage object without the corresponding information, an information input unit can be provided and connected with a processor, and signal transportation between the information input unit and the processor can be realized, so as to realize the same effect of controlling the trigger structure.

For example, in the smart seal clamp provided by an example of the present embodiment, the information of the storage object includes an expiration date of the storage object, at this time, as illustrated by FIG. 2, the circuit board 110 further includes a timing circuit 115, which is communicated with the camera circuit 112 and configured to count down according to the expiration date of the storage object; the timing circuit 115 is communicated with the trigger structure circuit 114, the trigger structure circuit 114 controls the trigger structure 140 to trigger the seal structure 130 to seal the packaging bag upon the countdown being zero. Thus, the smart seal clamp provided by the present embodiment can automatically seal the packaging bag after the storage object exceeds its expiration date, to prevent the storage object being eaten by mistake, so as to protect the health and safety of user. It is to be noted that, the information of the storage object may further include manufacture date of the storage object, and the timing circuit can count down by calculating the manufacture date and expiration date of the storage object. Because the storage object can use the smart seal clamp provided by the present embodiment from the manufacture date, the timing circuit can count down only according to the expiration date. Besides, for each time of using the smart seal clamp provided by the present embodiment to tightly clamp the packaging bag including the storage object, before the storage object is completely consumed, it is only needed to acquire the information of the storage and count down for one time.

For example, in the smart seal clamp provided by an example of the present embodiment, the information acquired by camera further includes face information of the current user, at this time, as illustrated by FIG. 2, the circuit board 110 further includes a processor 111, the processor 111 is communicated with the camera circuit 112, the processor 111 acquires face information of the current user from the camera circuit 112 and processes and judges the face information of the current user. The processor 111 is further communicated with the trigger structure circuit 114, the trigger structure circuit 114 controls the trigger structure 140 to trigger the seal structure 130 to seal the packaging bag according the judgment result of the processor 111. Thus, the smart seal clamp provided by the present embodiment can judge the current user and judge whether the current user has the privilege to eat or use the storage object in the packaging bag; if the current user does not have the privilege, sealing the packaging bag, or, it can be judged that whether the current user is a child or not, if the current user is a child, sealing the packaging bag to prevent the child form eating or using the storage object by mistake, so as to protect the health and safety of the child. It is to be noted that, the face information of the current user includes iris information of the current user.

For example, after the camera acquiring the face information of the current user, the processor receives and processes the face information, and makes judgment with the face information. For example, whether the current user is a child or an adult can be judged according to a distance between the camera and the human eyes, and whether the current user is a child or an adult can be further judged according to a distance between two eyes of the current user. Certainly, the embodiments of the present disclosure comprise but are not limited thereto, the processor can judge whether the current user is a child or an adult according to other distinctions between the face information of an adult and a child.

For example, in a case where the storage object in the packaging bag is medicine, the processor judges whether the current user is a child or not according to the face information of the current user, if the judgment result of the processor is yes, the trigger structure circuit can control the trigger structure to trigger the seal structure to seal the packaging bag, to prevent the child form eating the medicine, so as to protect the health of the child.

For example, in a case where the storage object is a knife, the processor judges whether the current user is a child or not according to the face information of the current user, if the judgment result of the processor is yes, the trigger structure circuit can control the trigger structure to trigger the seal structure to seal the packaging bag, to prevent the child using the knife, so as to protect the safety of the child.

For example, in the smart seal clamp provided by an example of the present embodiment, as illustrated by FIG. 2, the circuit board 110 further includes a memory 113, the memory 113 can store pictures of various objects or pre-input face information, the processor 111 is communicated with the memory 113 to make judgment about the specie of the storage object with the pictures of various objects or judgment about the face information of the current user with the pre-input face information.

For example, in a case where the memory 113 stores a lot of pictures of various objects, the processor 111 can match a picture of the storage object shoot by the camera 120 with the pictures of various objects, so as to judge the specie of the storage object.

For example, in a case where the memory 113 stores pre-input face information (for example, pictures), the processor 111 can match the face information of the current user acquired by the camera 120 with the pre-input face information, so as to make judgment. For example, the pre-input face information may include pictures of the elderly, the child, and the young people in the family of the user. The processor 111 can match the face information of the current user acquired by the camera 120 with the pre-input face information, so as to judge that whether the current user is a people in the family of the user, and judge whether the user is a child, an elderly, or a young people.

It is to be noted that, the abovementioned processor and memory can be integrated into an integrated circuit. Besides, the abovementioned timing circuit, processor and memory can independently exist or exist together, so as to realize different functions and combination of different functions.

For example, the circuit board may include a printed circuit board (PCB), the camera circuit and the trigger structure circuit can be integrated on the printed circuit board. It is to be noted that, the circuit board 110 can be a flexible circuit board, at this time, the circuit board 110 can include a flexible printed circuit board (FPCB).

For example, the circuit board further includes an insulating layer, and the insulating layer can protect the circuit board from the corrosion of water and oxygen, so as to improve the service life of the smart seal clamp provided by the present embodiment.

Figure 3:
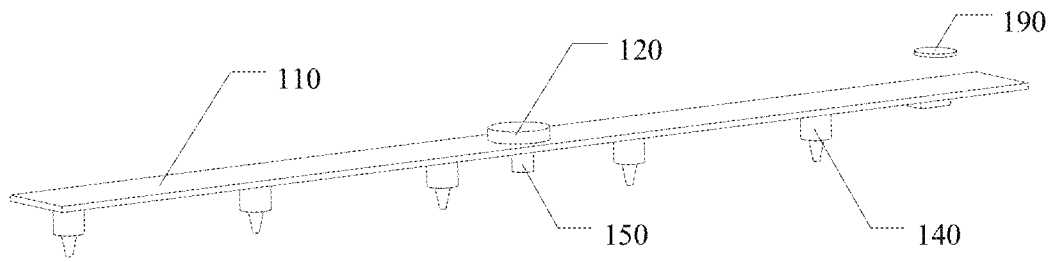
FIG. 3 is a structural schematic diagram of a circuit board and other components disposed on the circuit board in a smart seal clamp provided by an embodiment of the present disclosure.

For example, in the smart seal clamp provided by an example of the present embodiment, as illustrated by FIG. 3, the camera 120 is disposed on the circuit board 110. In this case, the camera 120 can be communicated with the camera circuit 112 through a wire. Certainly, the embodiments of the present disclosure include but are not limited thereto, and the camera can be communicated with the camera circuit through a wireless method.

For example, in the smart seal clamp provided by an example of the present embodiment, as illustrated by FIG. 3, the trigger structure 140 is disposed on the circuit board 110. In this case, the trigger structure 140 can be communicated with the trigger structure circuit 114 through a wire. Certainly, the embodiments of the present disclosure include but are not limited thereto, and the trigger structure can be communicated with the trigger structure circuit through a wireless method.

For example, in the smart seal clamp provided by an example of the present embodiment, as illustrated by FIG. 3, the smart seal clamp further includes an infrared detector 150, the infrared detector 150 can be used to detect the storage object in the packaging bag. Thus, the smart seal clamp provided by the present embodiment can judge whether there is a storage object or not in the packaging bag through the infrared detector.

For example, the infrared detector 150 can be communicated with the trigger structure circuit 114. Thus, before the trigger structure circuit controls the trigger structure to seal the packaging bag, the infrared detector can be used to judge whether there is a storage object in the packaging bag or not, if there is no storage object in the packaging bag, do not seal the packaging bag, so as to save the seal structure and avoid sealing the packaging bag when it is unnecessary.

For example, in the smart seal clamp provided by an example of the present embodiment, as illustrated by FIG. 3, the infrared detector 150 can be disposed on a side of the circuit board 110 opposite to the camera 120. Thus, the infrared detector 150 can detect the state of the smart seal clamp provided by the present embodiment, the smart seal clamp provided by the present embodiment stays in an open state or a closed state. As seen, the process that the trigger structure circuit controls the trigger structure to trigger the seal structure to seal the packaging bag can be activated upon the state information of the smart seal clamp provided by the infrared detector 150 being in a closed state, so as to prevent the seal structure falling in the packaging bag and polluting the storage object upon the smart seal clamp being an open state. It is to be noted that, the abovementioned open state refers to that the smart seal clamp does not tightly clamp the packaging bag, the packaging bag is in an open state, the abovementioned closed state refers to that the smart seal clamp tightly clamp the packaging bag, and the packaging bag is in a closed state.

For example, in a smart seal clamp provided by an example of the present embodiment, as illustrated by FIG. 3, the smart seal clamp further includes a battery 190, the battery 190 is disposed on the circuit board 110 to provide electricity to the circuit board 110.

Figure 4:
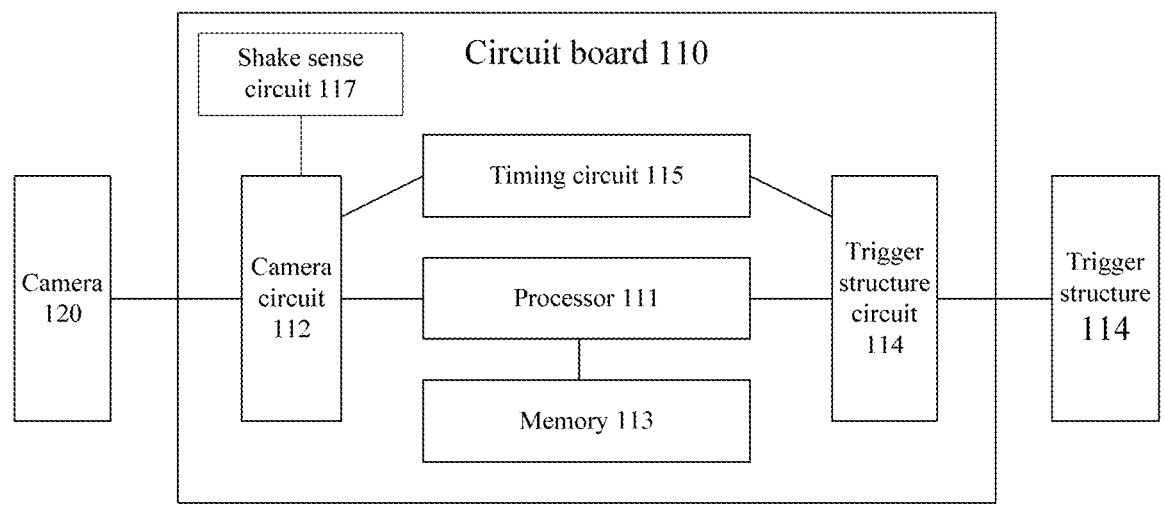
FIG. 4 is a schematic diagram of another circuit board in a smart seal clamp provided by an embodiment of the present disclosure.

For example, in a smart seal clamp provided by an example of the present embodiment, as illustrated by FIG. 4, the circuit board 110 further includes a shake sense circuit 117, the shake sense circuit 117 is communicated with the camera circuit 112, the shake sense circuit 117 can be used to sense a shake and activate the camera 120 after sensing a shake. Thus, upon the smart seal clamp provided by the present embodiment being touched, the generated shake is detected by the shake sense circuit, at this time, the shake sense circuit can activate the camera, such that the camera starts to acquire information, such as face information of the current user, so as to execute the abovementioned judgment steps.

Figure 5:
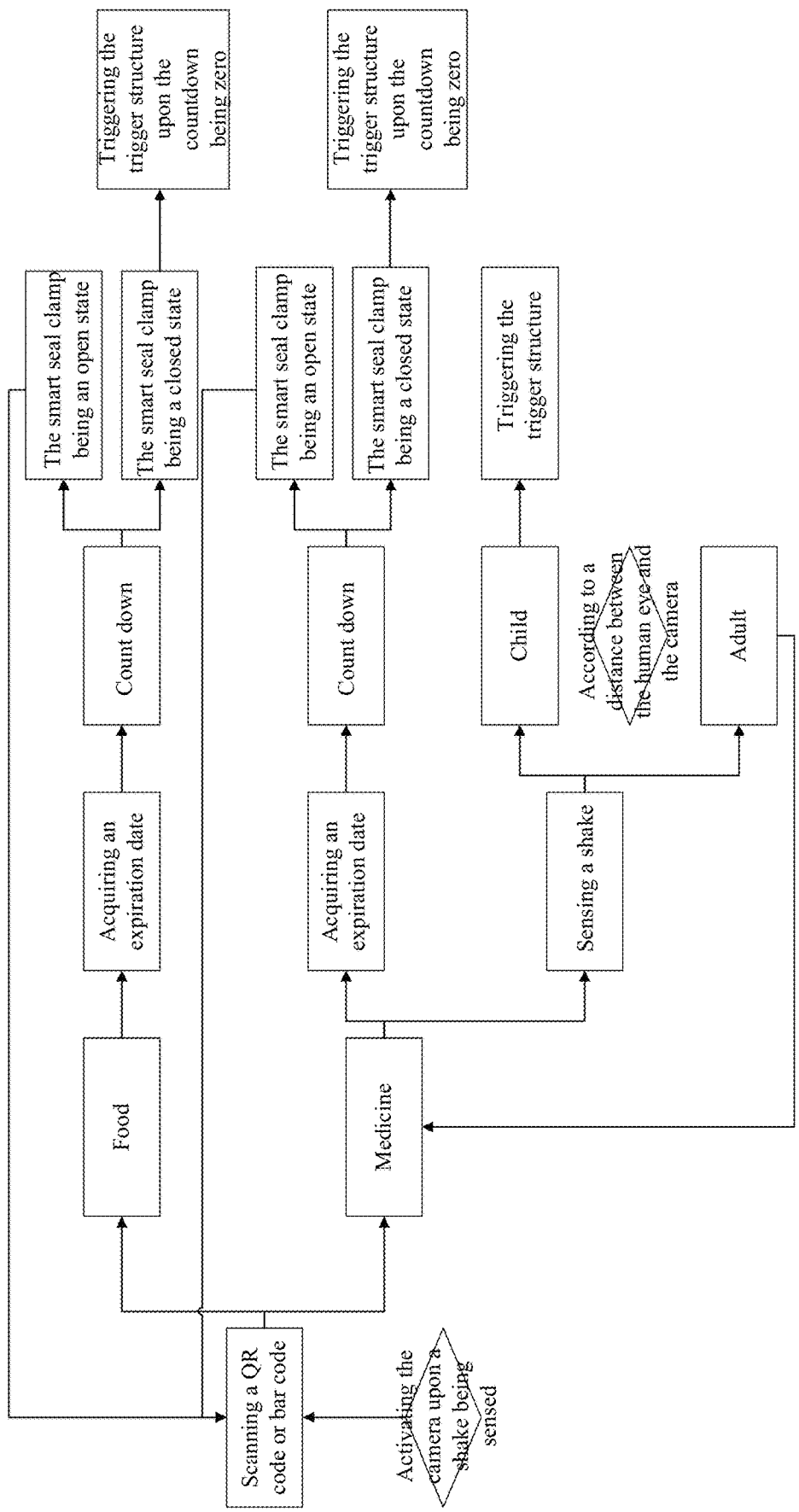
FIG. 5 is a work flow diagram of a smart seal clamp provided by an embodiment of the present disclosure.

For example, in the smart seal clamp provided by an example of the present embodiment, the storage object includes food or medicine. FIG. 5 is a work flow diagram of a smart seal clamp provided by the present embodiment. As illustrated by FIG. 5, upon the smart seal clamp sensing a shake, the camera starts to work, at this time, the camera can be utilized to scan a QR code or bar code recording the information of the storage object, so as to acquire information such as the spices and expiration date of the storage object. Upon the expiration date of the storage object is acquired, no matter the storage object is food or medicine, the smart seal clamp starts to count down. In a case where the smart seal clamp is closed, the trigger structure is controlled to trigger the seal structure to seal the packaging bag if the countdown is zero. Upon the specie of the storage object is acquired, if the storage object is medicine, the smart seal clamp activates the camera to acquire the face information of the current user when a shake is detected, so as to judge whether the current user is an adult or a child, if the current user is a child, the trigger structure is controlled to trigger the seal structure to seal the packaging bag. Certainly, the embodiments of the present disclosure include but are not limited thereto, and smart seal clamp provided by the present embodiment can be used to realize other functions.

Second Embodiment

Figure 6A:
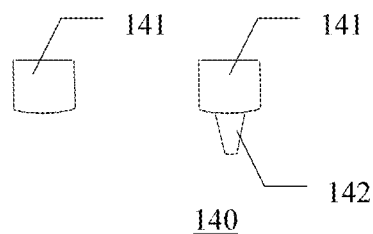
FIG. 6a is a structural schematic diagram of a trigger structure in a smart seal clamp provided by an embodiment of the present disclosure.

On the basis of the first embodiment, the present embodiment provides a smart seal clamp, as illustrated by FIG. 6*a*, the trigger structure can be a stretchable needle structure 140, as illustrated by FIG. 6*a*, the seal structure 130 comprises a liquid sealant 131 and an encapsulation 132, the liquid sealant 131 is encapsulated in the encapsulation 132, the stretchable needle structure 140 can puncture the encapsulation 132 to make the liquid sealant 131 flow out in a triggered state, the liquid sealant 131 solidifies at an opening of the packaging bag and seals the packaging bag. It is to be noted that, the liquid sealant can form a ring body surrounding the opening of the packaging bag to seal the opening of the packaging bag.

For example, in the smart seal clamp provided by an example of the present embodiment, the stretchable needle structure 140 can simultaneously puncture the encapsulation 132 and the packaging bag to make the liquid sealant 131 flow out and seal the packaging bag. Since the packaging bag is punctured, the liquid sealant 131 can enter an inner side of the opening of the packaging bag, so as to seal the packaging bag more tightly.

Figure 6B:
FIG. 6b is a structural schematic diagram of a seal structure in a smart seal clamp provided by an embodiment of the present disclosure.

For example, as illustrated by FIG. 6, the stretchable needle structure 140 can include a sleeve 141 and a needle 142 disposed in the sleeve 141 and configured to stretch out from the sleeve 141.

For example, in the smart seal clamp provided by an example of the present embodiment, the trigger structure includes a metal heater, the seal structure includes thermosensitive sealant, the metal heater can use electricity to heat and fuse the thermo-sensitive sealant, so as to seal the packaging bag. It is to be noted that, the metal heater can be used together with the stretchable needle structure or independently.

Figure 7:
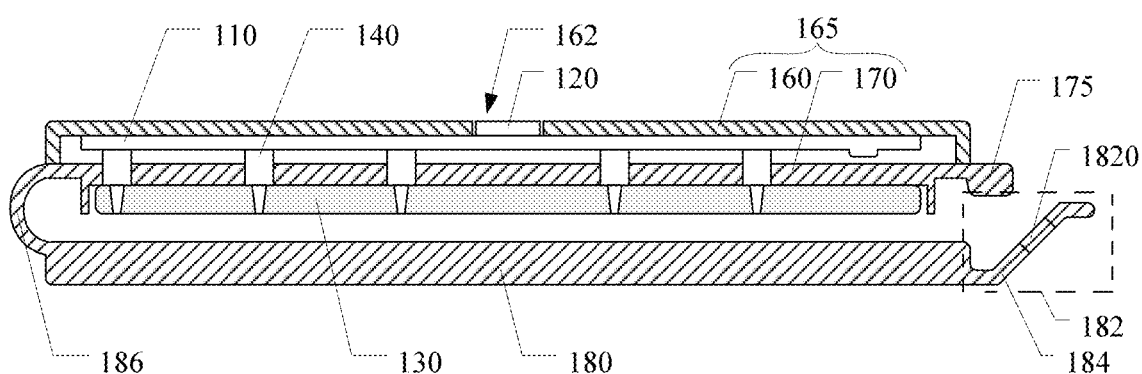
FIG. 7 is a structural schematic diagram of a smart seal clamp provided by an embodiment of the present disclosure.

For example, in the smart seal clamp provided by an example of the present embodiment, as illustrated by FIG. 7, the seal clamp further includes an upper cap 160 and a lower cap 170, the upper cap 160 and the lower cap 170 are assembled to form a shell 165. The circuit board 110, the camera 120 and the trigger structure 140 are disposed in the shell 165. Thus, the shell 165 can play a role of protecting the circuit board 110, the camera 120 and the trigger structure 140. The upper cap 160 includes a first via hole 162, the camera 120 can be exposed out of the shell through the first via hole 162, the lower cap 170 includes at least one second via hole 172 and a containing groove 174 corresponding to the second via hole, the containing groove 174 is disposed at a side of the lower cap 170 away from the upper cap 160, the trigger structure 140 can be respectively exposed out from the shell through the second via hole 172. Besides, the seal structure 130 can be disposed in the containing groove 174, referring to FIG. 1. As seen, the trigger structure 140 can trigger the seal structure 130 to seal the packaging bag through the second via hole 172. For example, the metal heater can be disposed in the shell 165, at this time, the trigger structure 140 in the second via hole 172 can realize a heat conduction function (not shown in the drawings). The metal heater can also be disposed between the lower cap 170 and the seal structure 130, when it is needed to realize the trigger function, the metal heater can directly heat the seal structure 130 (not shown in the drawings).

For example, in the smart seal clamp provided by an example of the present embodiment, a position of the upper cap provided with the first via hole can be disposed as a roundness shape or a heart shape, to attract the attention of the current user, so as to help the camera to acquire the face information of the current user. Certainly, the position of the upper cap provided with the first via hole can be further provided with a light emitting element to attract the attention of the current user, the embodiments of the present disclosure are not limited thereto.

For example, in the smart seal clamp provided by an example of the present embodiment, as illustrated by FIG. 7, the smart seal clamp further includes a hold plate 180. One end of the hold plate 180 is connected with the shell 165, the other end of the hold plate 180 includes a clamping portion 182, the clamping portion 182 is configured to be fixed with the shell 165 to tightly clamp the opening of the packaging bag between the shell 165 and the hold plate 180.

For example, as illustrated by FIG. 7, one end of the hold plate 180 can be connected with a lower cap 170 through an elastic portion 186, so as to realize the connection with the shell 165. Besides, because the elastic portion 186 is elastic, the hold plate 180 can rotate about the elastic portion 185 as an axis, so as to get away or close to the shell 165. With the help of the clamping portion 182 disposed at the other end of the hold plate 180, the hold plate 180 can realize tightly clamping the opening of the packaging bag between the shell 165 and the hold plate. It is to be noted that, one end of the hold plate can be connected with an upper cap to realize the connection with the shell, besides, one end of the hold plate can be connected with the upper cap or the lower cap through a hinge joint portion, the embodiments of the present disclosure are not limited thereto.

For example, the hold plate 180 can be integrated with the elastic portion 186, the upper cap 160 or the lower cap 170.

For example, the clamping portion 182 can include a third via hole 1820, one end of the lower cap 170 close to the clamping portion 182 is provided with a protrusion portion 175, the protrusion portion 175 can enter the third via hole 1820 and being in interference fit with the third via hole 1820 or buckle with the third via hole 1820 to tightly clamp the packaging bag. It is to be noted that, the clamping portion can adopt other structures or methods to fix with the shell and tightly clamp the opening of the packaging bag between the shell and the hold plate, the embodiments of the present disclosure are not limited thereto.

For example, in the smart seal clamp provided by an example of the present embodiment, as illustrated by FIG. 7, the hold plate 180 includes a fingerprint recognition module 184, the finger recognize module 184 is communicated with the circuit board 110, the fingerprint recognition module 184 can be used to detect and recognize fingerprint. Thus, the smart seal clamp provided by the present embodiment can judge whether the current user has the privilege to eat or use the storage object in the packaging bag, or judge whether the current user is a child.

For example, in the smart seal clamp provided by an example of the present embodiment, as illustrated by FIG. 7, the fingerprint recognition module 184 is disposed at the clamping portion 182 of the hold plate 180. Upon the current user opening the smart seal clamp provided by the present embodiment, the current user must touch the clamping portion 182 of the hold plate 180. Thus, it is more humanistic and practical to dispose the fingerprint recognition module 184 at the clamping portion 182 of the hold plate 180.

Third Embodiment

Figure 8:
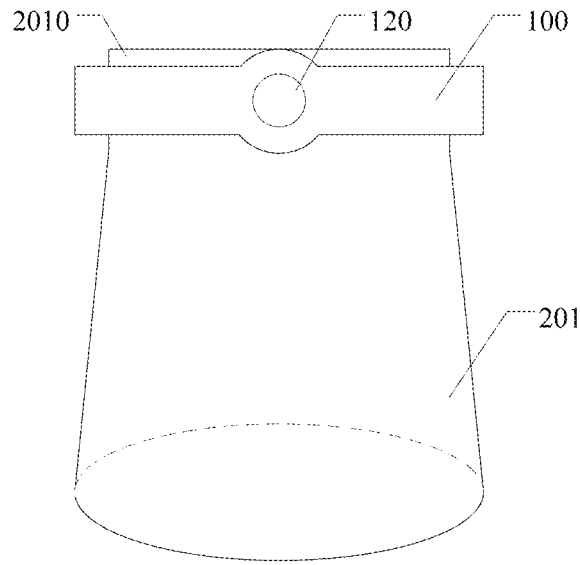
FIG. 8 is a structural schematic diagram of a smart packaging bag provided by an embodiment of the present disclosure.

The present embodiment provides a smart packaging bag. As illustrated by FIG. 8, the smart packaging bag includes a packaging bag 201 and a smart seal clamp 100, the smart seal clamp is disposed at an opening 2010 of the packaging bag 201 and configured to tightly clamp the opening 2010. The smart seal clamp 100 can be any one of the smart seal clamps in the abovementioned embodiments. The smart packaging bag provided by the present embodiment can be directly used to store an object to be stored (for example, food or medicine), without any extra packaging bags. Besides, the smart packaging bag includes any one of the smart seal clamps provided by the abovementioned embodiments, thus, the smart packaging bag has the corresponding functions and effects with the smart seal clamp it includes, and the specific description about the functions and effects can refer to the relevant descriptions in the first embodiment and the second embodiment, and the repeated portions are omitted herein.

Fourth Embodiment

Figure 9:
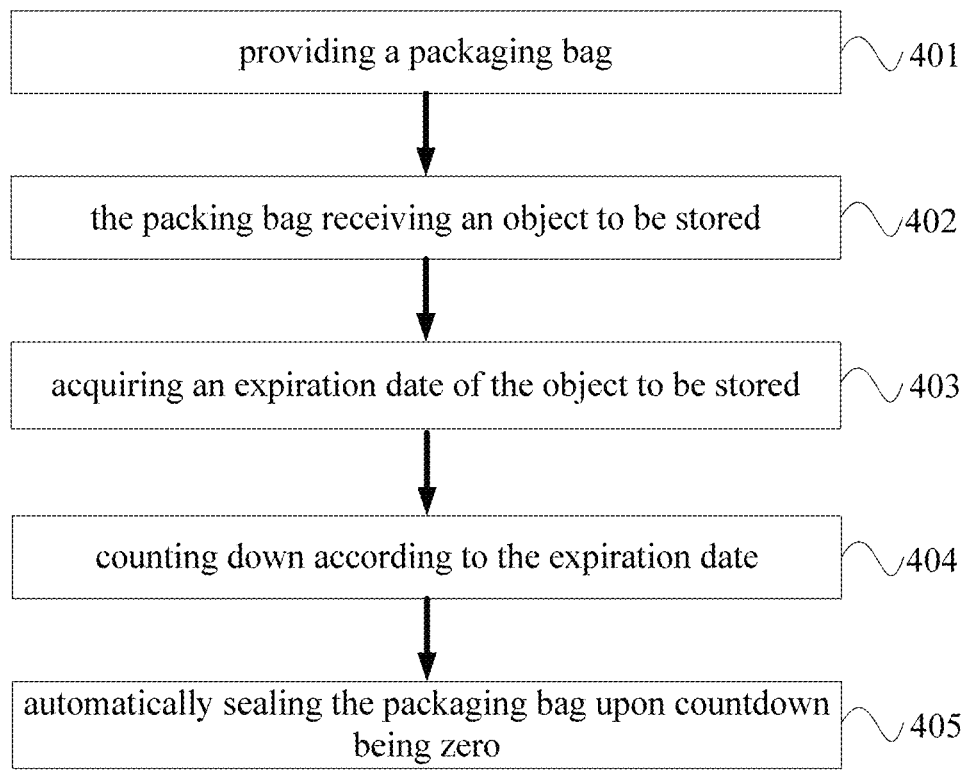
FIG. 9 is a flow diagram of a storage and management method of an object provided by an embodiment of the present disclosure.

The present embodiment provides a storage and management method of an object. As illustrated by FIG. 9, the storage and management method of an object includes the followings steps 401-405.

Step 401: providing a packaging bag. It is to be noted that, the abovementioned packaging bag can be a packaging bag of the object to be stored, or an additionally provided packaging bag.

Step 402: the packing bag receiving an object to be stored.

Step 403: acquiring an expiration date of the object to be stored.

For example, the expiration date of the object to be stored can be acquired by scanning a QR code or bar code.

Step 404: counting down according to the expiration date.

For example, a timer or a timing circuit can be used to count down by calculating the manufacture date and the expiration date of the object to be stored. It is to be noted that, the object to be stored can be disposed in the packaging bag from the manufacture date, thus, the timer or the timing circuit can count down only according to the expiration date.

Step 405: automatically sealing the packaging bag upon countdown being zero.

For example, a sealant can be used to seal the opening of the packaging bag, so as to seal the packaging bag.

In the storage and management method of an object provided by the present embodiment, because it is counted down according to the expiration date of the object to be stored, upon the countdown being zero, automatically sealing the packaging bag, so as to prevent the object to be stored which is expired from being eaten or used by mistake.

For example, in the storage and management method of an object provided by an example of the present embodiment, the method further includes: acquiring specie information of the object to be stored; acquiring face information or fingerprint information of a current user upon the object to be stored being medicine; judging whether the current user is an adult or a child according to the face information or the fingerprint information of the current user; and sealing the packaging bag upon the current user being judged as a child. Thus, the storage and management method of an object provided by the present embodiment can prevent the child eating the medicine by mistake, so as to protect the health and safety of the child.

For example, in the storage and management method of an object provided by an example of the present embodiment, acquiring the expiration date or the specie information of the object to be stored comprises: using a camera to acquire expiration date or the specie information of the object to be stored. For example, using a camera to scan a QR code or bar code recording the information of the object to be stored, so as to acquire the expiration date or specie of the object to be stored. Certainly, the embodiments of the present disclosure include but are not limited thereto, using a camera to shoot a picture of the object to be stored and smartly matching the information such as specie of the storage object. Besides, with regard to storage object without the corresponding information, an information input unit can be provided and connected with a processor, and the signal transportation between the information input unit and the processor can be realized, so as to realize the same effect of controlling the trigger structure.

For example, in the storage and management method provided by an example of the present embodiment, the method further includes: detecting a shake; and activating the camera upon a shake being detected, and the camera starts to acquire the specie and expiration date of the object to be stored.

For example, in the storage and management method provided by an example of the present embodiment, the storage object includes food or medicine. Upon sensing a shake, the camera starts to work, at this time, the camera can be utilized to scan a QR code or bar code recording the information of the storage object, so as to acquire information such as the spices and expiration date of the storage object. Upon the expiration date of the storage object is acquired, no matter the storage object is food or medicine, the smart seal clamp starts to count down. The trigger structure is controlled to trigger the seal structure to seal the packaging bag if the countdown is zero. Upon the specie of the storage object is acquired, if the storage object is medicine, the smart seal clamp activates the camera to acquire the face information of the current user when a shake is detected, so as to judge whether the current user is an adult or a child, if the current user is a child, the trigger structure is controlled to trigger the seal structure to seal the packaging bag.

For example, in the storage and management method provided by an example of the present embodiment, sealing the packaging bag comprises: using a retractable needle structure to puncture an encapsulation encapsulating a liquid sealant to make the liquid sealant flow out and seal the packaging bag.

For example, in the storage and management method provided by an example of the present embodiment, sealing the packaging bag comprises: using a metal heater to heat and fuse a thermo-sensitive sealant to seal the packaging bag.

The following statements should be noted:

(1) The accompanying drawings involve only the structure(s) in connection with the embodiment(s) of the present disclosure, and other structure(s) can be referred to common design(s).

(2) In case of no conflict, features in one embodiment or in different embodiments can be combined.

(3) For the circuits in the embodiments of the invention, those skilled in the art can establish hardware circuits having the corresponding functions. The hardware circuits include conventional very large scale integration (VLSI) circuits or gate arrays and conventional semiconductors such as logic chips and transistors or other discrete elements.

The foregoing is only the preferred embodiments of the present invention and not intended to limit the scope of protection of the present invention. Any change or replacement that may be easily thought of by those skilled in the art within the technical scope disclosed by the present invention shall fall within the scope of protection of the present invention. Therefore, the scope of protection of the present invention shall be defined by the appended claims.

The application claims priority to the Chinese patent application No. 201610657214.5, filed Aug. 11, 2016, the disclosure of which is incorporated herein by reference as part of the application.

The invention claimed is:

1. A smart seal clamp, configured to clamp a packaging bag for containing a storage object, comprising:
    a circuit board;
    a camera configured to acquire information;
    a seal structure; and
    at least one trigger structure configured to trigger the seal structure to seal the packaging bag,
    wherein the circuit board comprises a camera circuit and a trigger structure circuit, the camera circuit is communicated with the camera and configured to control the camera, the trigger structure circuit is communicated with the at least one trigger structure and configured to control the at least one trigger structure, and the trigger structure circuit is further communicated with the camera circuit and configured to control the at least one trigger structure according to the information acquired by the camera.

2. The smart seal clamp according to claim 1, wherein the information acquired by the camera comprises information of the storage object, and the trigger structure circuit is configured to control the at least one trigger structure according to the information of the storage object acquired by the camera.

3. The smart seal clamp according to claim 2, wherein the information of the storage object comprises an expiration date of the storage object, the circuit board further comprises:
   a timing circuit, wherein the timing circuit is communicated with the camera circuit and configured to count down according to the expiration date of the storage object, the timing circuit is communicated with the trigger structure circuit, and the trigger structure circuit is configured to trigger the seal structure to seal the packaging bag upon countdown being zero.

4. The smart seal clamp according to claim 1, wherein the information acquired by the camera further comprises face information of a current user, the circuit board further comprises:
   a processor communicated with the camera circuit and configured to process and judge the face information of the current user, the processor is communicated with the trigger structure circuit, and the trigger structure circuit is configured to trigger the seal structure to seal the packaging bag according to a judgment result of the processor.

5. The smart seal clamp according to claim 4, wherein the processor is configured to judge whether the current user is a child or not, and the trigger structure circuit is configured to trigger the seal structure to seal the packaging bag upon the judgment result of the processor being yes.

6. The smart seal clamp according to claim 4, wherein the circuit board further comprises a memory, configured to store pictures of various objects or pre-input face information, and the processor is communicated with the memory and configured to judge species of the storage object with the pictures of various objects or judge the face information of the current user with the pre-input face information.

7. The smart seal clamp according to claim 1, further comprising:
   an infrared detector,
   wherein the infrared detector is configured to detect a state of the storage object in the packaging bag or the smart seal clamp.

8. The smart seal clamp according to claim 1, wherein the at least one trigger structure comprises a retractable needle structure, the seal structure comprises an encapsulation and a liquid sealant encapsulated in the encapsulation, and the retractable needle structure is configured to puncture the encapsulation to make the liquid sealant flow out and seal the packaging bag under a triggered state.

9. The smart seal clamp according to claim 8, wherein the retractable needle structure is configured to puncture the encapsulation and the packaging bag to make the liquid sealant flow out and seal the packaging bag under the triggered state.

10. The smart seal clamp according to claim 1, wherein the at least one trigger structure comprises a metal heater, the seal structure comprises a thermo-sensitive sealant, and the metal heater is configured to use electricity to heat and fuse the thermo-sensitive sealant to seal the packaging bag under a triggered state.

11. The smart seal clamp according to claim 1, wherein the circuit board further comprises a shake sense circuit communicated with the camera circuit and configured to activate the camera upon sensing a shake.

12. The smart seal clamp according to claim 1, further comprising:
   an upper cap, comprising a first via hole; and
   a lower cap, comprising at least one second via hole and a containing groove corresponding to the at least one second via hole,
   wherein the upper cap and the lower cap are assembled to form a shell, the containing groove is located at a side of the lower cap away from the upper cap, the circuit board, the camera and the at least one trigger structure are located inside the shell, the camera is exposed out of the shell from the first via hole, the at least one trigger structure is exposed out of the shell from the at least one second via hole, and the seal structure is located in the containing groove.

13. The smart seal clamp according to claim 12, further comprising:
   a hold plate,
   wherein one end of the hold plate is connected with the shell, another end of the hold plate comprises a clamping portion, and the clamping portion is configured to be fixed with the shell to tightly clamp an opening of the packaging bag between the shell and the hold plate.

14. The smart seal clamp according to claim 13, wherein the clamping portion comprises a fingerprint recognition module, communicated with the circuit board, and configured to detect and recognize a fingerprint.

15. The smart seal clamp according to claim 1, wherein the storage object comprises food or medicine.

16. A smart packaging bag, comprising:
   a packaging bag; and
   a smart seal clamp located at an opening of the packaging bag,
   wherein the smart seal clamp comprises the smart seal clamp according to claim 1.

* * * * *

UNITED STATES PATENT AND TRADEMARK OFFICE
CERTIFICATE OF CORRECTION

| | |
|---|---|
| PATENT NO. | : 10,752,406 B2 |
| APPLICATION NO. | : 15/562190 |
| DATED | : August 25, 2020 |
| INVENTOR(S) | : Yan Ren |

It is certified that error appears in the above-identified patent and that said Letters Patent is hereby corrected as shown below:

On the Title Page

Item [73], insert:
--BOE TECHNOLOGY GROUP CO., LTD., Beijing (CN)--

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*